United States Patent [19]

De Vries

[11] 3,895,350

[45] July 15, 1975

[54] METHOD OF AND DEVICE FOR RECOGNITION OF CHARACTERS

[75] Inventor: Willem Cecil De Vries, Hague, Netherlands

[73] Assignee: U.S. Philips Corporation, New York, N.Y.

[22] Filed: Mar. 8, 1974

[21] Appl. No.: 449,356

Related U.S. Application Data

[63] Continuation of Ser. No. 299,146, Oct. 19, 1972, abandoned, which is a continuation of Ser. No. 127,673, March 24, 1971, abandoned.

[30] Foreign Application Priority Data

Mar. 26, 1970 Netherlands .......................... 7004381

[52] U.S. Cl. .......................................... 340/146.3 D

[51] Int. Cl. .......................................... G06k 9/00

[58] Field of Search .......... 340/146.3 D, 146.3 AQ, 340/146.3 ED; 235/61.7 B

[56] References Cited

UNITED STATES PATENTS

| | | | |
|---|---|---|---|
| 3,182,290 | 5/1965 | Rabinow | 340/146.3 D |
| 3,585,588 | 6/1971 | Hardin et al. | 340/146.3 D |
| 3,764,980 | 10/1973 | Dansac et al. | 340/146.3 D |

*Primary Examiner*—Joseph M. Thesz, Jr.
*Attorney, Agent, or Firm*—Frank R. Trifari

[57] ABSTRACT

An unknown character is recognized according to two different principles, so that also two recognition results are produced. If the latter results correspond, the character has been recognized.

6 Claims, 3 Drawing Figures

Figure 1:
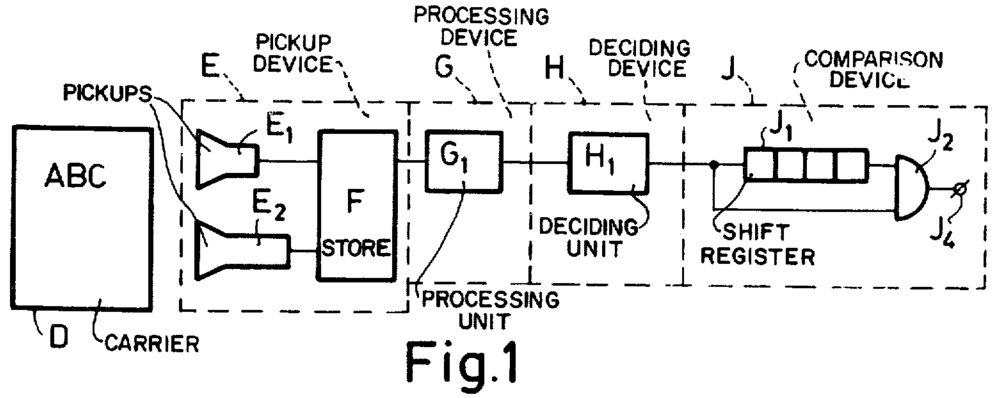

INVENTOR.
WILLEM CECIL DE VRIES
BY
Frank R. Trifari
AGENT

METHOD OF AND DEVICE FOR RECOGNITION OF CHARACTERS

This is a continuation of application Ser. No. 299,146, filed Oct. 19, 1972 which in turn is a continuation of Ser. No. 127,673, Filed Mar. 24, 1971 both of which are now abandoned.

The invention relates to a method of recognizing readable characters, in which according to a first principle signals are derived from the characters which are processed to first results from which recognition of the characters may follow. Two kinds of errors are known to occur with such methods, on the one hand because a character is not recognized, and on the other hand because a character is incorrectly recognized. On the one hand, the criteria for recognizing may be chosen very severely; in that case many characters of mediare quality will not be recognized. On the other hand, the criteria may also be loosely chosen. In that case characters will often be incorrectly recognized. The invention eliminates this drawback as it is characterized in that, moreover, according to at least one second principle, signals may be derived from the characters and be processed to second results from which recognition may follow, said at least one second principle being different from said first principle and a character being recognizable in the case of correspondence of several recognitions. As different criteria are thus used, each of them individually may be more loosely defined. The risk that a character is incorrectly recognized several times in the same way is very small.

The recognitions themselves need not even be unambiguous as long as the combination thereof is unambiguous. If the result of the first method is: it is a "2" or a "5," and of the second method: it is a "5" or a "6," the character may be recognized as a "5."

The invention also relates to a device for recognizing characters accommodated on a carrier, characterized in that at least two recognition devices are provided which operate according to basically different techniques for the recognition of characters, each character being recognized only if this character is recognized in the same way by several recognition devices. By using two recognition devices operating according to basically different techniques, the said different criteria may be implemented. The recognition devices may recognize a given character either simultaneously or consecutively.

The invention also relates to a device for recognizing characters accommodated on a carrier according to the method claimed in claim 1, comprising a pick-up device deriving information from the characters, a processing device receiving signals from the pick-up device, and a deciding device to which output signals of the processing device can be supplied and in which a character is recognizable, so that a recognition signal appears on an output of the deciding device. To this end, the pick-up device comprises at least one first pick-up element and one second pick-up element operating according to different principles, the signals thereof being separately supplyable to said processing device, the output signals of the processing device generated on the basis, thereof being separately supplyable to said deciding device, so that always a recognition signal appears on an output thereof. A comparison device is provided to which said recognition signals can be supplied for comparison so that in the case of correspondence of said recognition signals an additional recognition signal can be generated. The invention may be readily carried into effect as a result of two pick-up elements operating according to different principles. The pick-up elements may, for example, detect different characteristics of the character. If these characteristics are not correlated, the recognition is not correlated either, and thus the risk of incorrect recognition twice in the same way is very small. In this way, moreover, each pick-up element has to derive only a limited number of data from the character as the character is recognized at least twice. The construction of the pick-up elements may thus be simpler, or they can operate faster than if they had to pick-up all information. As the results are processed separately, the comparison may be effected in a simple manner, for example, by means of an AND-function. Furthermore, as only the pick-up element is provided in duplicate an inexpensive construction system is achieved. The character is recognized by the additional recognition signal.

A preferred embodiment of a device according to the invention is characterized in that said processing device comprises at least one first and one second processing unit, each of which can be supplied with at least a portion of the signals from the pick-up device, said first and second processing units operating according to different principles, the output signals of said processing units being separately supplyable to the deciding device, so that always a recognition signal appears on an output thereof. A comparison device is provided to which said recognition signals can be supplied for comparison, so that in the case of correspondence of said recognition signals an additional recognition signal can be generated. In this case a single pick-up element may be incorporated. It is possible that each processing unit receives a given portion of the information derived from the character. This may be effected according to different sequences. As the principles of the processing units are different, sets of non-correlated characteristics may be selected so that the recognitions are non-correlated either. As a result a finer and a more exact distinction are possible.

A preferred embodiment of a device according to the invention is characterized in that said processing device comprises at least one first and one second processing unit, to each of which the signals of said first and second pick-up element can be separately supplied, the output signals thereof being separately supplyable to the deciding device. As in this case both picking-up and processing are effected in parallel, the processing speed may be increased.

A further preferred embodiment of a device according to the invention is characterized in that said at least first and second processing units operate according to different principles. Consequently, both a fast and an accurate distinction are realized.

A further preferred embodiment of a device according to the invention is characterized in that said deciding device comprises at least two deciding units, the inputs of which are always connected to the outputs of said at least first and second processing units, the respective recognition signals appearing on the outputs thereof. A high speed is obtained by making all processes run in parallel in each case.

A further preferred embodiment of a device according to the invention is characterized in that a control device is provided which upon the command of a recognition signal generated as a result of the signals of said at least first processing unit, supplies a starting signal to said at least one second processing unit. For example, if the first recognition is sufficiently unambiguous, the second recognition need not be effected, whilst in the case of an insufficient recognition a confirmation thereof is necessary. The newly introduced method may be very accurate, but rather slow, with the result that the average speed remains high.

In order that the invention may be readily carried into effect, three embodiments thereof will now be described in detail, by way of example, with reference to the accompanying diagrammatic drawings.

FIG. 1 shows a first embodiment and comprises a carrier with characters D, a pick-up device E comprising two pick-ups E1 and E2 and a store F, a processing device G comprising a first processing unit G1, a deciding device H comprising a deciding unit H1 and a comparison device J comprising a shift register J1, a logical AND-gate J2 and an output terminal J4.

Characters are generally recognized according to a procedure comprising several stages. First, the character is presented on a carrier, for example, a sheet of paper. Data are derived from the character by a pick-up element. The pick-up element comprises, for example, a photoelectric cell which senses the carrier according to a given pattern. Next, the output signal of the photoelectric cell may be adapted, for example, by converting the analogue signal into a two-level signal. After that, the information of the character is further processed. This may be effected in many ways. The dimensions of the character may be standardized, it may be freed from interferene (for example, by separating two characters touching each other). The character may also be reduced to a character skeleton, or an autocorrelation may be performed. The processed data derived from the character are then compared with specimen characters from which as many comparison results follow as there are specimen characters taken into account. Next, a decision is made on the basis of the comparison results. This decision may be that the character has been recognized as a given character, or that the character has not been recognized.

The pick-up elements E1 and E2 derive information from the characters A, B and C, on the carrier D, said information being stored in the store F. The information from E1 is supplied to the processing unit G1, in which the results are processed: for example, the character is standardized as regards dimensions and is compared with a collection of specimen characters. In the deciding unit H1 the comparison results are compared and the best comparison result is selected; this produces an identification which is supplied, for example, as a 1-out-of-*n* code to the shift register J1. Subsequently, the same is done as regards the information picked up by E2. If the second, provisional recognition signal has been determined as a 1-out-of-*n* code by the deciding unit H1, both codes are supplied to the AND-gate J2. If the codes correspond, the additional recognition signal appears as a 1-out-of-*n* code on the output terminal J4 and the character has been recognized. The device shown in FIG. 1 may also incorporate a synchronization device by which, for example, both 1-out-of-*n* *n*-codes are synchronized, but this device has been omitted for the sake of simplicity.

Nowadays, very different pick-up principles are known. For example, U.S. Pat. No. 3,114,131 (R. J. Fuss) describes a method in which characters printed with magnetisable ink are recognized. With the aid of a magnetic head a characteristic waveform is derived from each kind of character. On the other hand, the pick-up E2 may be based on optical principles. It is then possible that always the same waveform is obtained for both methods, which may, of course, be processed in the same way. This method may be used for quality control of machines producing these printed characters. For example, a large number of printers exist which regularly supply samples which are recognized in a separate device.

U.S. Pat. No. 3,104,368 (F. Steinbuch) describes a method using a special pattern of resistive probes. If a probe coincides with a portion of a character, the resistance changes. For each character to be examined a binary code is thus formed, which is compared with specimen characters. The device shown in FIG. 1 then comprises, for example, a pick-up element which according to U.S. Pat. No. 3,114,131 derives a waveform from the character and in parallel a pick-up element which operates with the said resistive probes. In the processing device the information is compared with a collection of specimen characters. This collection may alternatively be different for the two pick-ups.

Figure 2:
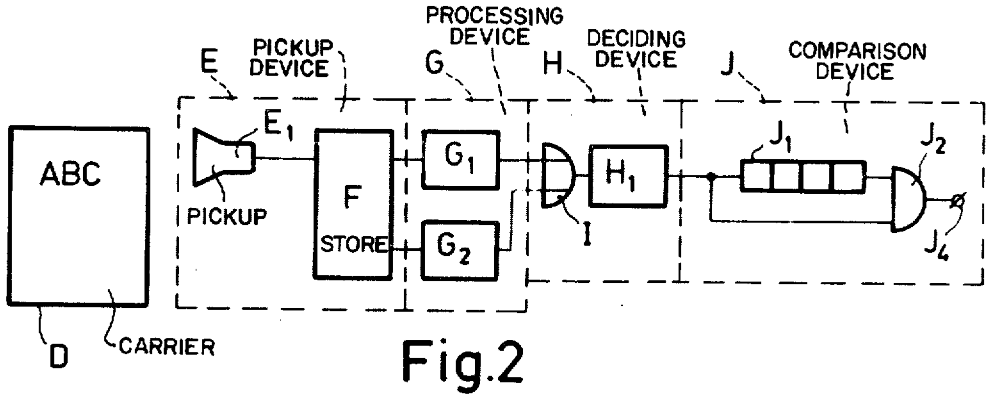

FIG. 2 shows a different embodiment according to the invention, which corresponds in major parts with FIG. 1. However, only one pick-up element E1 is incorporated in this case. On the other hand, the processing device G now comprises two processing units G1 and G2. Furthermore, a logical OR-gate I is provided.

The pick-up E1 element now comprises, for example, a row of photoelectric cells or a flying spot camera which senses the character area according to a pattern, for example, column-wise. The information is stored in F. The information may be processed in different ways, embodiments thereof being known from literature.

According to U.S. Pat. No. 3,237,161 (J. Rabinow) the area of a character is divided into sections which are considered to be black or wihte, the respective information being stored. In a relay bank provided for each different character, the information is compared with the information of a stored character. The character showing the best correspondence is identical to the examined one.

U.S. Pat. No. 3,088,097 (K-Steinbuch) describes the extraction of shape elements from the character information. If a sufficient number of shape elements has been found the identity of the character may be determined therefrom. Shape elements are, for example, horizontal, vertical or oblique line elements.

U.S. Pat. No. 3,196,398 (H. B. Baskin) describes how a character is stored as a matrix of points which may have four different black levels, amongst them white. Next, a process is described as regards how to derive a skeleton character from this character, the line elements thereof having a thickness of only one matrix point.

The U.S. Pat. No. 3,192,315 (W. R. Remley) describes a method in which the character is filtered. As a result, an auto-correlation is obtained so that the recognition of a character is facilitated.

Considering the quoted U.S. Pat. Nos. 3,237,161, 3,088,097, 3,196,398 and 3,192,315 it is obvious that for the processing units G1 and G2 very different principles are possible. The results of the comparisons between the characters thus processed and the collection of specimen characters appears on the outputs of G1 and G2, respectively, and are supplied via the OR-gate I to the deciding unit H1 which has already been described.

For example, it is possible that G1 performs a direct comparison, whilst in G2 first the shape elements are extracted from the character information, after which the shape elements are compared with those of standard characters. The extraction of the shape elements requires times so that the output signals of G2 appear after those of G1. The further recognition is effected in the same way as shown in FIG. 1.

Figure 3:
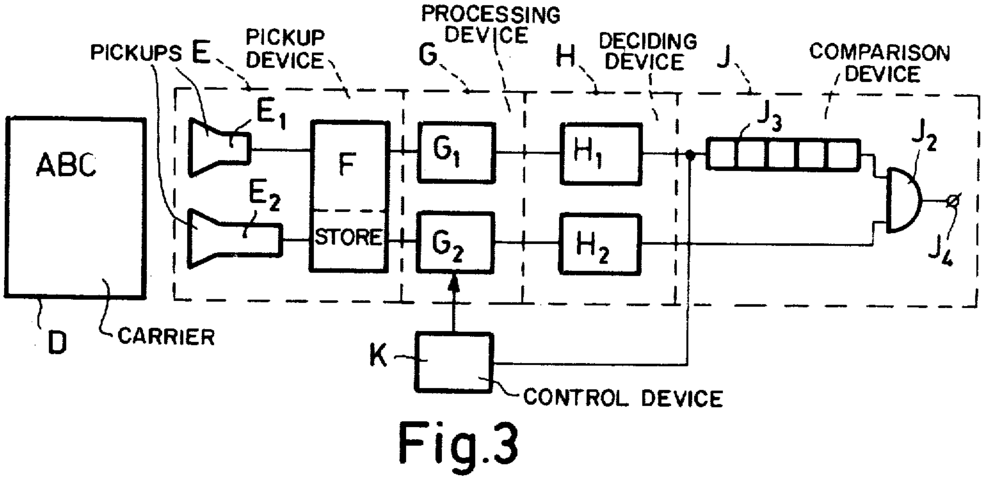

FIG. 3 shows a further embodiment of a device according to the invention which, in addition to the already mentioned elements, comprises the control device K. Furthermore, the deciding device H comprises the deciding units H1 and H2 and the comparison device J with shift register J3. Both recognitions are performed completely parallel and, consequently, still further recognition principles may be used, which are known from literature. For example, U.S. Pat. No. 2,026,329 (G. Tauschek) of 1929 already describes a method in which a mask having a translucent pattern is compared with a character.

U.S. Pat. No. 3,383,516 (J. J. Leimer) describes a method in which a flying spot scanner follows the edge of the character after which this information is further processed.

Finally, U.S. Pat. No. 2,980,801 describes a character provided with an additional magnetizable code. The recognition of the code is described, but the character itself may also be recognized and it can be established whether correspondence exists. In view of the latter Patent Specification, the invention may be used as a means for checking whether in both cases an adequate printing quality has been obtained.

The device shown in FIG. 3 furthermore comprises a control device K. It may be that the recognition in the chain F-G1-H1 was not sufficiently sure. This may occur if the comparison scores between the examined character and several specimen characters were substantially equally high. This is the case, for example, signalled by an additional signal on the output of H1. This may be a bit signal additionally associated with the 1-out-of-*n* code, or a signal on an additional output line of H1. This signal is supplied to the control device K which starts the second processing unit G2. The latter operates, for example, very accurately but also rather slowly. The character has been recognized only if the 1-out-of-*n* code of H1 (without any additional bit information which caused K to supply a starting signal to G2) corresponds with a code to be supplied by H2.

Furthermore, in the deciding units H1 and H2 a relative decision may be made: identification is effected on the basis of the comparatively best correspondence. However, the recognition may also be absolute: a character is recognized only if a minimum correspondence is achieved. The recognition may then be unambiguous: an identification with one standard character is effected. On the other hand, this is not necessary: the combination of the recognitions then has to be unambiguous. It is furthermore possible that recognition takes place more than twice according to different principles, whilst on the basis of the results a majority decision is made. Furthermore, it is possible that each principle is used more than once. The examined character is then recognized only if it has been recognized at least once according to each principle. Furthermore, in the foregoing always two principles have been assumed for the recognition, but this may easily be a larger number.

What is claimed is:

1. A device for recognizing characters accommodated on a carrier comprising a pick-up device deriving information from the characters, a processing device coupled to and receiving signals from the pick-up device, a deciding device coupled to said processing device and to which output signals of said processing device are supplied and in which a character is recognizable, the output of said deciding device providing a recognition signal, said pick-up device comprising at least one first pick-up element and one second pick-up element, each of said pick-up elements providing a character signal in accordance with operating principles which are completely different geometrically, physically and logically from each other, the signals thereof being separately supplyable to said processing device, the output signals of said processing device generated on the basis thereof being separately and simultaneously supplyable to said deciding device, so that a respective recognition signal appears on an output thereof, each recognition being based upon loosely defined recognition criteria, and a comparison device to which said recognition signals can be supplied for comparison, said comparison device being responsive to a correspondence of said recognition signals whereby a final recognition signal can be generated.

2. A device as claimed in claim 1, wherein said processing device comprises at least one first and one second processing unit, to each one of which the signals of said first and second pick-up can be separately supplied, the output signals thereof being separately supplyable to the deciding device.

3. A device as claimed in calim 2, wherein at least said first and second processing units operate according to different principles.

4. A device for recognizing characters accommodated on a carrier comprising a pick-up device for deriving information from the characters, a processing device coupled to and receiving signals from said pick-up device, and a deciding device coupled to and receiving output signals from said processing device, said deciding device determining that a character is recognizable, so that a recognition signal appears on an output of said deciding device, said processing device comprising at least one first and one second processing unit, each of which can be supplied with at least a portion of the signals from the pick-up device, said first and second processing units operating according to completely different principles geometrically, physically and logically, the output signals of said processing units being separately and simultaneously supplyable to said deciding device, so that a respective recognition signal appears on the output thereof, each respective recognition capable of being based upon loosely defined recognition criteria, and a comparison device, said comparison device receiving said recognition signals for comparison, so that in the case of correspondence of said recognition signals and additional recognition signal can be generated.

5. A device as claimed in claim 4, wherein said deciding device comprises at least two deciding units, the respective inputs of which are connected to the outputs of said at least first and second processing units, the respective recognition signals appearing on the outputs thereof.

6. A device as claimed in claim 4, wherein a control device is provided coupled to said first and second processing units and is responsive to the command of a recognition signal generated as a result of the signals of said at least first processing unit, and which supplies a starting signal to said at least one second processing unit.

* * * * *